United States Patent Office 3,559,058
Patented Jan. 26, 1971

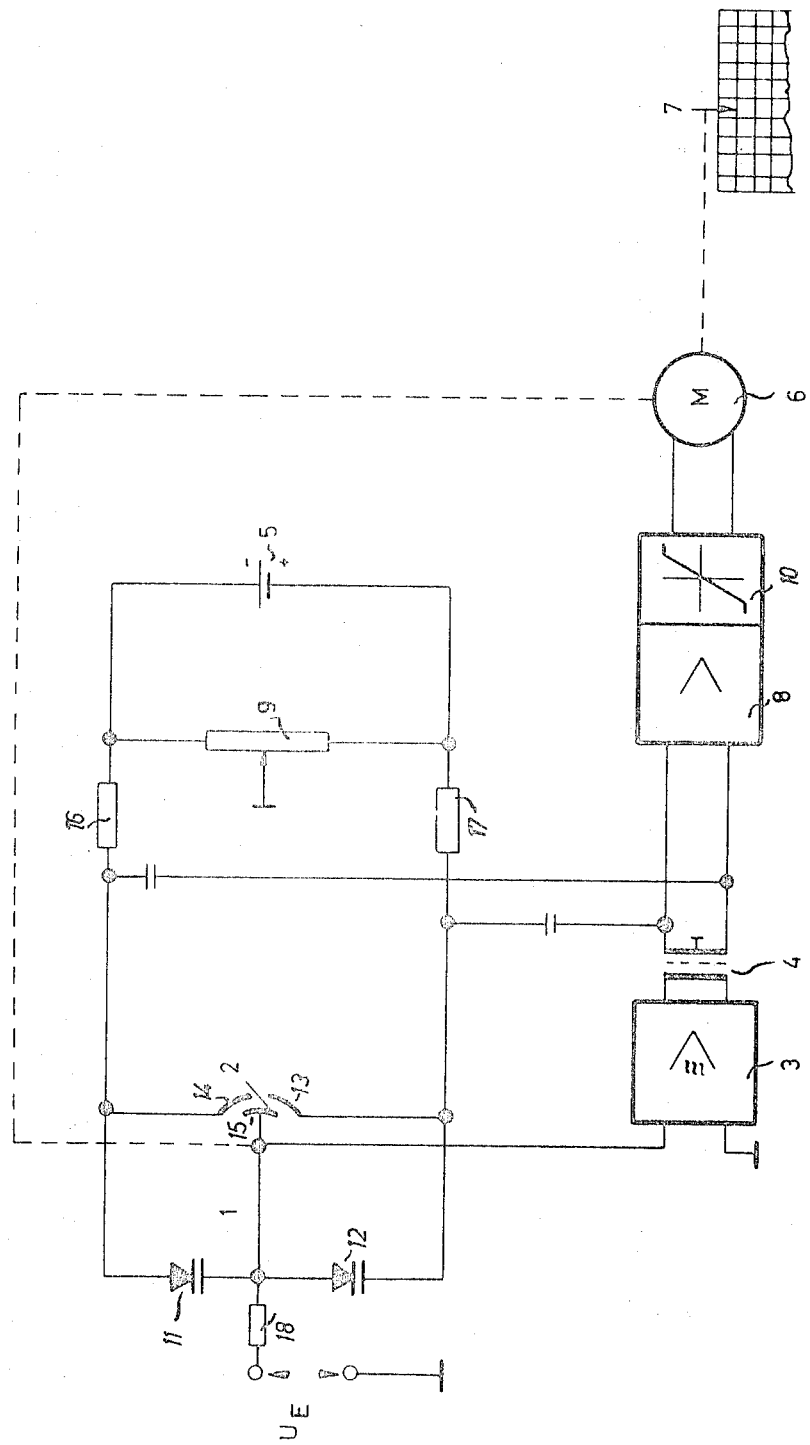

3,559,058
COMPENSATED ELECTRICAL MEASURING INSTRUMENT
Ludwig Ludin, Anglikon, Wohlen, Switzerland, assignor to Camille Bauer Messinstrumente Aktiengesellschaft, Wohlen (Aargau), Switzerland, a joint-stock company of Switzerland
Filed July 15, 1968, Ser. No. 745,041
Claims priority, application Germany, July 18, 1967, H 63,316
Int. Cl. G01r 17/06
U.S. Cl. 324—99      2 Claims

ABSTRACT OF THE DISCLOSURE

An electrical measuring instrument wherein a change in input quantity is compensated by a corresponding change in feedback from an output. Interconnected capacitors whose capacitance is dependent on voltage have their capacity altered by change of input and the altered capacities are balanced by varying the relative capacitances of a variable differential capacitor, the extent of variation to produce balance being a measure of the output.

CROSS REFERENCE TO RELATED APPLICATION

My co-pending application, Ser. No. 551,706, filed May 20, 1966 employing voltage dependent capacitors in a system to indicate angular position of an element of a differential capacitor.

BACKGROUND OF THE INVENTION

(1) Field of the invention

An instrument for measuring applied voltage wherein a change of voltage disturbs the capacitance of capacitors in a network with feedback means for matching the disturbance.

(2) Description of the prior art

Changes in input quantities to electrical measuring instruments have been compensated or countered by feedback alteration cutting in or out current from an auxiliary source by means of a tapped resistor. Such instruments are shown in "Archiv für technisches Messen" J 239-8, of November 1964, page 259, FIG. 15. A servomotor having feedback changes the taps in the input circuit until a null condition is obtained. The position of the motor is an indication of the input quantity.

Such known compensation networks have a number of disadvantages. For instance, the slide pressing on the contact strips of the coils of the resistor is subjected to a certain degree of wear which requires periodic maintenance in order to refine the electric connection or refinish the contact strips. Another problem is that when the instrument is allowed to remain unused for a period of time and the slide remains in the same position, then the contact surfaces become corroded in the locations not engaged by the slide and this leads to noise and interference when the instrument is put back into operation. Besides, it must be considered that in the known networks there is a drawback in that at the moment of switching in, a counter or external voltage appears in the measuring circuit originating in the compensator itself. The input resistance can be of considerably low ohmic-resistance at the moment of switching in and is, besides, not constant during the setting operation.

SUMMARY OF THE INVENTION

This invention is an improved electrical measuring instrument wherein a change in the input measuring quantity is compensated by a corresponding change of an output quantity fed back to the input circuit. A main feature of novelty is that an electrical input measuring quantity altering the capacitance of voltage dependent capacitors is compensated by a mechanically adjusting of variable condensers and that the position of adjustment is a measure of the output quantity.

An advantage of the invention is the virtual absence of moving contacts due to the use of variable condensers in the regulation of feedback from the output to the input. In an especially advantageous form of the invention the voltage dependent capacitors as well as the variable condenser, are in the form of differential capacitors and arranged in a bridged circuit which includes a resonant circuit amplifier, in other words the amplifier is self oscillatory.

DRAWING

The drawing shows the circuitry of the invention.

DESCRIPTION OF THE PREFERRED EMBODIMENT

Two alterable differential capacitors connected in parallel, namely on the one hand those formed by the differential arrangement formed by respective capacity diodes 11 and 12 and on the other a variable differential capacitor 2, lie in the feedback circuit of an alternating current amplifier 3 and form a bridge 1 with the secondary winding of an output transformer 4 receiving output from the amplifier 3. The capacitances of the two capacity diodes 11 and 12 connected into the differential circuit become altered as a function of the applied input voltage $U_E$. The two capacitor diodes are biased to a definite reference capacity by a constant source of DC current 5 having resistors 16 and 17 interposed between the DC source and the capacity diodes. The variable differential capacitor 2 is made up of two fixed electrodes or plates 13 and 14 opposite a turnable plate 15 which is capacitorily associated with both fixed plates but in varying degrees dependent on the spacial relationship of the turnable plate to the fixed plates. The variable differential capacitor is connected in parallel to the differential circuit of the capacity diodes, that is to say, the fixed plates 13 and 14 are respectively connected to the respective electrodes of opposite polarity in the capacity diodes, while the movable plate 15 is connected to the junction between the capacity diodes. The plate or electrode 15 is turned by the output from a servomotor 6 to adjust plate 15, the motor being coupled to an indicator 7 to indicate the position of the plate 15, and as will be explained, to indicate the output from the transformer 4 and consequently the the input to the amplifier 3.

The bridge circuit composed of the secondary winding of the output transformer 4 and the variable capacitors 11, 12 and 2 is in the feedback circuit of an alternating curent amplifier which is self oscillatory. Each one of the arms of the bridge supplies feedback in a positive or negative sense respectively from the output of the amplifier to the input at $U_E$ owing to the variable capacitances.

In the initial position, that is to say, when the value of $U_E$ is zero, the bridge itself, or the differential capacitors in the respective positive or negative feedback circuits, are so preset that the alternating current amplifier 3 is excited and oscillates at about half normal amplitude. If now an input signal of any changing sense is applied at $U_E$ it disturbs either the capacitance portion of the positive feedback arm of the bridge so that the amplifier is further self excited or it disturbs the capacitance portion of the negative feedback so that the oscillation decays. These amplitude changes become amplified and regulate a servomotor 6 by means of a second amplifier 8 and a discriminator 10 connected thereto. The motor then varies the position of the electrode or plate 15 of the differential capacitor, in the same direction, until the bridge is again brought into balance, that is to say, until the change in capacity of the two capacity diodes 11 and 12 due to the input voltage $U_E$, has been compensated. The resulting movement developed by the servomotor used for adjusting the angular relationship in the differential capacitor 2 is therefore a measure of the applied voltage and this movement can be indicated or recorded by the pointer or stylus 7 since it too is ganged to the motor.

As already mentioned, the discriminator 10, as a stage added to the output of the amplifier 8, as well as the self-oscillatory amplifier, are all so adjusted and tuned that when the applied signal $U_E$ is zero and the system is balanced out, the motor is at a standstill. Any change in the input at $U_E$ consequently has an effect on the capacitance of the differential network and consequently on the amplitude of the self-oscillatory amplifier 3. By movement of the servomotor the feedback or coupling for the amplifier 3 becomes altered continuously until the amplitude corresponding to bridge balance is again obtained and the motor stops running. This is then true when capacitance alteration caused by the input voltage affects the capacity diodes 11 and 12 in the differential network 1 and is compensated by a corresponding alteration of the differential capacitor 2.

The null point for the system as indicated by pointer 7 can be set by means of a variably shunting potentiometer 8 in the balancing circuit for the capacity diodes. Serial resistors 16 and 17 serve also to pass enough current necessary for the polarization of the capacity diodes yet essentially isolate DC and AC voltage carrying elements of the circuit.

Instead of the described circuit employing an AC servomotor a DC motor may be used, in which case the amplifier 8 and the discriminator 10 or only the discriminator are removed. The DC motor would then be connected directly by a unidirectional circuit to the output terminals of the resonant amplifier 3, in such a way only a source of DC is connected in series with the DC motor, the DC source serving for reverse grid voltage for enabling the indication of the source of the alternating input signals. Also in this modification the self oscillating amplifier would oscillate at a generally average amplitude, the unidirectional portion is off-set exactly by the additional DC reverse grid voltage.

I claim:
1. An electrical measuring instrument comprising, an alternating current amplifier for self-oscillation having a resonant feedback circuit path containing a pair of voltage dependent capacitors and a mechanically variable differential capacitor having a moveable plate, means to apply an input voltage to be measured to the voltage-dependent capacitors in a differential manner so that the capacitance of one capacitor decreases while the capacitance of the other capacitor increases wherein the output amplitude of the amplifier for self-oscillation is changed, means responsive to a departure from a predetermined amplitude at the output of the amplifier for self-oscillation for positioning the moveable plate of the differential capacitor to compensate for the input voltage to be measured induced change in the voltage-dependent capacitors and return the output of the amplifier for self-oscillation to the predetermined amplitude, and means coupled to the moveable plate to provide an indication of the value of the input voltage to be measured.

2. In an instrument as claimed in claim 1, wherein the output of the amplifier for self-oscillation is about half-rated amplitude, so that an input voltage to be measured may either increase or decrease the amplitude depending on the sense of the input.

References Cited
UNITED STATES PATENTS

| | | | |
|---|---|---|---|
| 2,713,656 | 7/1955 | Meadows et al. | 324—99X |
| 2,854,629 | 9/1958 | Thirup | 324—99 |
| 2,962,641 | 11/1960 | Maltby et al. | 324—99X |
| 3,256,481 | 6/1966 | Pulvari | 324—109X |

RUDOLPH V. ROBINEC, Primary Examiner

E. F. KARLSEN, Assistant Examiner

U.S. Cl. X.R.
324—100